(12) United States Patent
Tenghamn

(10) Patent No.: US 7,974,152 B2
(45) Date of Patent: Jul. 5, 2011

(54) CONTROL SYSTEM FOR MARINE VIBRATORS AND SEISMIC ACQUISITION SYSTEM USING SUCH CONTROL SYSTEM

(75) Inventor: Stig Rune Lennart Tenghamn, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 176 days.

(21) Appl. No.: 12/456,841

(22) Filed: Jun. 23, 2009

(65) Prior Publication Data
US 2010/0322028 A1   Dec. 23, 2010

(51) Int. Cl.
*G01V 1/38* (2006.01)
(52) U.S. Cl. ............................. 367/23; 367/190; 181/110
(58) Field of Classification Search ........... 340/15.5 TD, 340/15.5 TC, 15.5 CC, 17; 73/71.6; 181/102, 181/112, 113, 114, 121, 142, 401; 367/168; 702/17
See application file for complete search history.

(56) References Cited

U.S. PATENT DOCUMENTS

| | | | |
|---|---|---|---|
| 3,258,738 A | 6/1966 | Merchant | |
| 3,886,493 A * | 5/1975 | Farr | 367/49 |
| 4,049,077 A * | 9/1977 | Mifsud | 181/114 |
| 4,159,463 A | 6/1979 | Silverman | |
| 4,420,826 A | 12/1983 | Marshall, Jr. et al. | |
| 4,633,970 A | 1/1987 | Mifsud | |
| 4,706,230 A | 11/1987 | Inoue et al. | |
| 4,715,020 A | 12/1987 | Landrum, Jr. | |
| 4,780,856 A | 10/1988 | Becquey | |
| 4,823,326 A | 4/1989 | Ward | |
| 4,926,392 A | 5/1990 | Handley et al. | |
| 4,941,202 A | 7/1990 | Upton | |
| 4,969,129 A | 11/1990 | Currie | |
| 5,126,979 A | 6/1992 | Rowe, Jr. et al. | |
| 5,329,499 A | 7/1994 | Molund et al. | |
| 5,375,101 A | 12/1994 | Wolfe et al. | |
| 5,457,752 A | 10/1995 | Engdahl et al. | |
| 5,546,361 A | 8/1996 | Boucher et al. | |
| 5,757,726 A | 5/1998 | Tenghamn et al. | |
| 5,757,728 A | 5/1998 | Tenghamn et al. | |
| 5,959,939 A | 9/1999 | Tenghamn et al. | |
| 6,035,257 A * | 3/2000 | Epperson | 702/17 |
| 6,041,888 A | 3/2000 | Tengham | |
| 6,076,629 A | 6/2000 | Tengham | |
| 6,085,862 A | 7/2000 | Tenghamn | |

(Continued)

FOREIGN PATENT DOCUMENTS
EA          003029         2/2002
(Continued)

OTHER PUBLICATIONS

Rune Tenghamn, An electrical marine vibrator with a flextensional shell, Exploration Geophysics vol. 37, No. 4, 286-291, 2006.*

(Continued)

*Primary Examiner* — Jack Keith
*Assistant Examiner* — Daniel L Murphy

(57) ABSTRACT

A method for controlling output of a marine seismic vibrator includes operating the vibrator using a predetermined driver signal. A vibrator output signal is measured at at least two different places on the vibrator. The at least two measured vibrator output signals are used to determine a corrected driver signal, wherein the corrected driver signal results in fewer harmonics of fundamental frequencies in the vibrator output. The vibrator is operated using the corrected driver signal.

22 Claims, 8 Drawing Sheets

U.S. PATENT DOCUMENTS

| | | |
|---|---|---|
| 6,488,117 B1 * | 12/2002 | Owen ............... 181/121 |
| 6,645,944 B2 | 4/2003 | de Kok |
| 6,704,245 B2 | 3/2004 | Becquey |
| 6,711,097 B1 | 3/2004 | Engdahl |
| 6,766,256 B2 | 7/2004 | Jeffryes |
| 6,851,511 B2 | 2/2005 | Tenghamn |
| 7,167,412 B2 | 1/2007 | Tenghamn |
| 7,257,049 B1 | 8/2007 | Laws et al. |
| 7,327,633 B2 | 2/2008 | Bagaini et al. |
| 7,376,045 B2 | 5/2008 | Falkenberg et al. |
| 7,515,505 B2 | 4/2009 | Krohn et al. |
| 7,551,518 B1 | 6/2009 | Tenghamn |
| 7,620,193 B2 | 11/2009 | Metheringham et al. |
| 7,881,158 B2 | 2/2011 | Tenghamn |
| 2003/0221901 A1 * | 12/2003 | Tenghamn ............... 181/121 |
| 2009/0010103 A1 | 1/2009 | Sallas et al. |
| 2009/0245019 A1 | 10/2009 | Falkenberg et al. |
| 2009/0321175 A1 | 12/2009 | Tenghamn |
| 2010/0118646 A1 | 5/2010 | Tenghamn |
| 2010/0118647 A1 | 5/2010 | Tenghamn |
| 2010/0322028 A1 | 12/2010 | Tenghamn |
| 2011/0038225 A1 | 2/2011 | Tenghamn |

FOREIGN PATENT DOCUMENTS

| | | |
|---|---|---|
| EA | 008398 | 8/2006 |
| RU | 1056100 | 11/1983 |
| RU | 2045079 | 9/1995 |
| RU | 2126983 | 2/1999 |
| WO | 2010002431 A1 | 1/2010 |
| WO | 2010037937 A1 | 4/2010 |

OTHER PUBLICATIONS

Data Sheet Terfenol-D.

H. A, J. Rijnja, Low Frequency Projectors for Sound Under Water, Netherlands Organization for Applied Scientific Research, Jan. 1991, Report No. FEL-90-A268, The Hague, The Netherlands.

Feng Xia, Q, M. Zhang: Z. Y. Cheng, A Class IV Flextensional Device Based on Electrostrictive Poly(vinylidene fluoride-trifluoroethylene) Copolymer, Jun. 2003.

Stig Rune Lennart Tenghamn, An Electrical marine Vibrator with a Flextensional Shell, Exploration Geophysics, Dec. 2006, vol. 37, No. 4, Oxford, England.

* cited by examiner

CONTROL SYSTEM FOR MARINE VIBRATORS AND SEISMIC ACQUISITION SYSTEM USING SUCH CONTROL SYSTEM

CROSS-REFERENCE TO RELATED APPLICATIONS Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic data acquisition. More specifically, the invention relates to control systems for marine seismic vibrators used as seismic energy sources.

2. Background Art

Seismic sources, including vibrators, are used in geophysical exploration on land and in water covered areas of the earth. Signals generated by these sources travel downwardly into the subsurface and are reflected from reflecting interfaces in the subsurface. The reflected energy is detected by signal detectors, typically hydrophones or geophones, on or near the earth's surface or near the water surface in water-covered exploration areas.

Most of the acoustic sources presently used in marine seismic acquisition operations are of the impulsive type, in which as much energy as possible is generated during as short a time span as possible. Examples of such impulse sources include air guns and water guns. The frequency content of such sources is controllable only to a small degree, and different individual sources are selected and operated together in an array for the generation of different frequency ranges of seismic energy for different seismic surveying needs.

Vibratory acoustic sources, including hydraulically powered sources and sources employing piezoelectric or magnetostrictive material, have been used in marine operations. However, such sources have found only limited use. Although such sources can generate signals over various frequency bands, commonly referred to as "frequency sweeps", the limited power that such sources known in the art have been able to generate have limited their use in marine operations.

It is well known that as sound waves travel through water and through subsurface geological structures, higher frequency sound waves are attenuated more rapidly than lower frequency sound waves, and consequently, lower frequency sound waves can be transmitted over longer distances through water and geological structures than higher frequency sound waves. There has for a long time been a need in the seismic sector of the oil and gas industry for powerful low frequency vibrator type marine seismic energy sources.

It is also important that the spectral content of the seismic energy generated by a vibrator be well known or characterized in order to be able to properly interpret the reflected seismic energy from the subsurface. Control methods used for operating high-powered land-based vibrators are not necessarily adaptable to use in controlling marine vibrators. There also exists a need for a control method for a marine vibrator to assure well characterized energy spectral content.

SUMMARY OF THE INVENTION

A method according to one aspect of the invention for controlling output of a marine seismic vibrator includes operating the vibrator using a predetermined driver signal. A vibrator output signal is measured at at least two different places on the vibrator. The at least two measured vibrator output signals are used to determine a corrected driver signal, wherein the corrected driver signal results in a repeatable output and fewer harmonics of fundamental frequencies in the vibrator output. The vibrator is operated using the corrected driver signal.

A method for marine seismic surveying according to another aspect of the invention includes deploying a marine vibrator and a plurality of seismic sensors in a body of water above an area of the subsurface to be evaluated. The vibrator is operated using a predetermined driver signal. A vibrator output signal is measured at at least two different places on the vibrator. The at least two measured vibrator output signals are used to determine a corrected driver signal. The corrected driver signal results in a repeatable output and fewer harmonics of fundamental frequencies in the vibrator output. The vibrator is operated using the corrected driver signal and seismic energy is detected at the plurality of seismic sensors.

Other aspects and advantages of the invention will be apparent from the following description and the appended claims.

DETAILED DESCRIPTION

Figure 1:
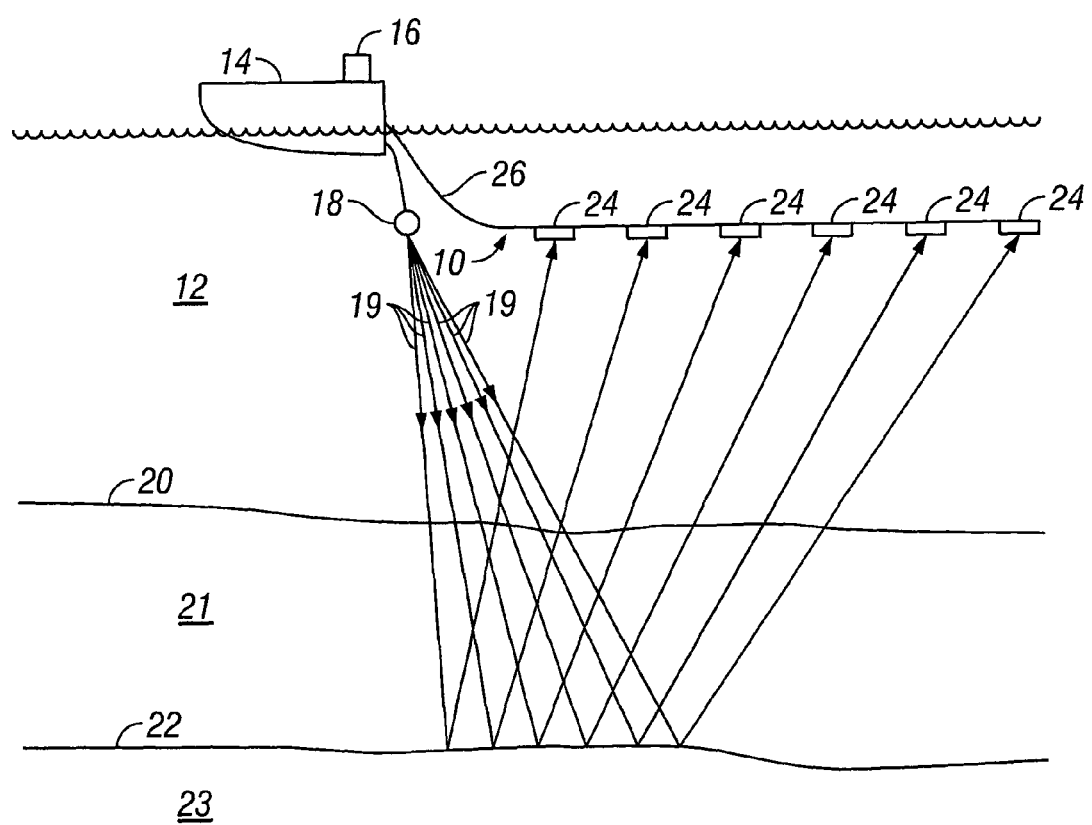
FIG. 1 shows an example marine seismic data acquisition system.
Figure 4:
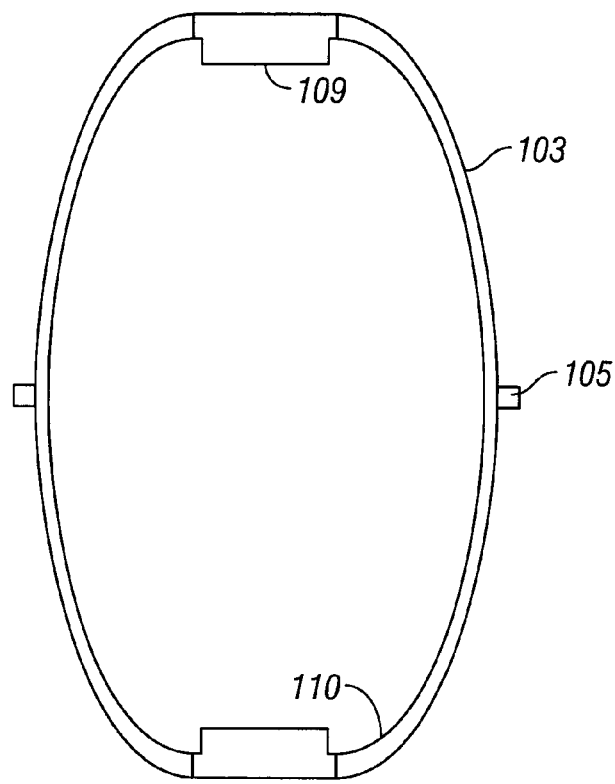
FIG. 4 shows the outer spring of an embodiment of the vibrator of FIG. 2.
Figure 5:
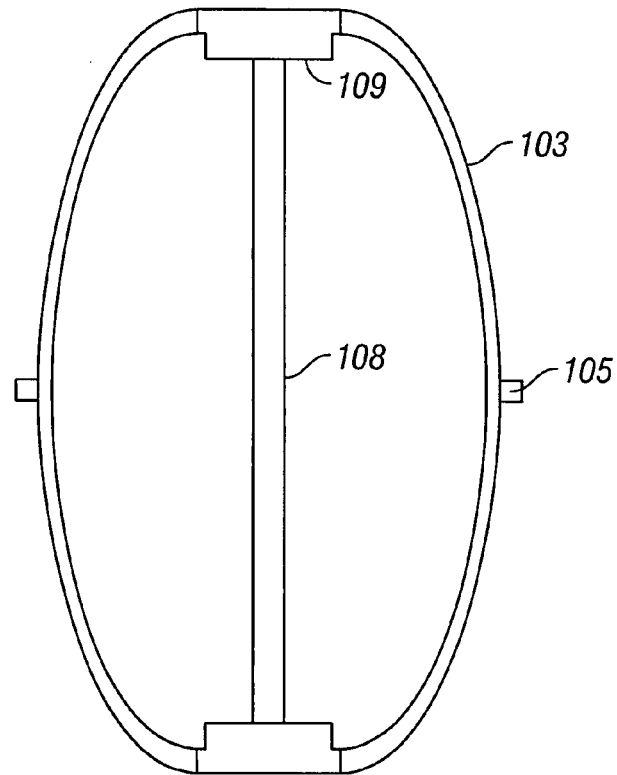
FIG. 5 shows the outer spring in combination with the driver.

FIG. 1 shows an example marine seismic data acquisition system as it is typically used for acquiring seismic data. A seismic vessel 14 moves along the surface of a body of water 12 such as a lake or the ocean. The marine seismic survey is intended to detect and record seismic signals related to structure and composition of various subsurface formations 21, 23 below the water bottom 20. The seismic vessel 14 includes source actuation, data recording and navigation equipment, shown generally at 16, referred to for convenience as a "recording system." The seismic vessel 14, or a different vessel (not shown), can tow one or more seismic energy sources 18, or arrays of such sources in the water 12. The seismic energy source(s) in the present example are marine vibrators of a structure and having a control system as will be further explained below. The seismic vessel 14 or a different vessel tows at least one seismic streamer 10 near the surface of the water 12. The streamer 10 is coupled to the vessel 14 by a lead in cable 26. A plurality of sensor arrays 24 are disposed at spaced apart locations along the streamer 10. The sensor arrays 24, as will be explained in more detail below with reference to FIGS. 3 through 5, are formed by mounting a seismic sensor inside each one of a plurality of sensor spacers and disposing the sensor spacers along the streamer in a particular arrangement.

During operation, certain equipment (not shown separately) in the recording system 16 causes the vibrator 18 to actuate at selected times. When actuated, the vibrator 18 produces seismic energy 19 that emanates generally outwardly from the vibrator 18. The energy 19 travels downwardly, through the water 12, and passes, at least in part, through the water bottom 20 into the formations 21, 23 below. Seismic energy 19 is at least partially reflected from one or more acoustic impedance boundaries 22 below the water bottom 20, and travels upwardly whereupon it may be detected by the sensors in each sensor array 24. Structure of the formations 21, 23, among other properties of the Earth's subsurface, can be inferred by travel time of the energy 19 and by characteristics of the detected energy such as its amplitude and phase.

Figure 2:
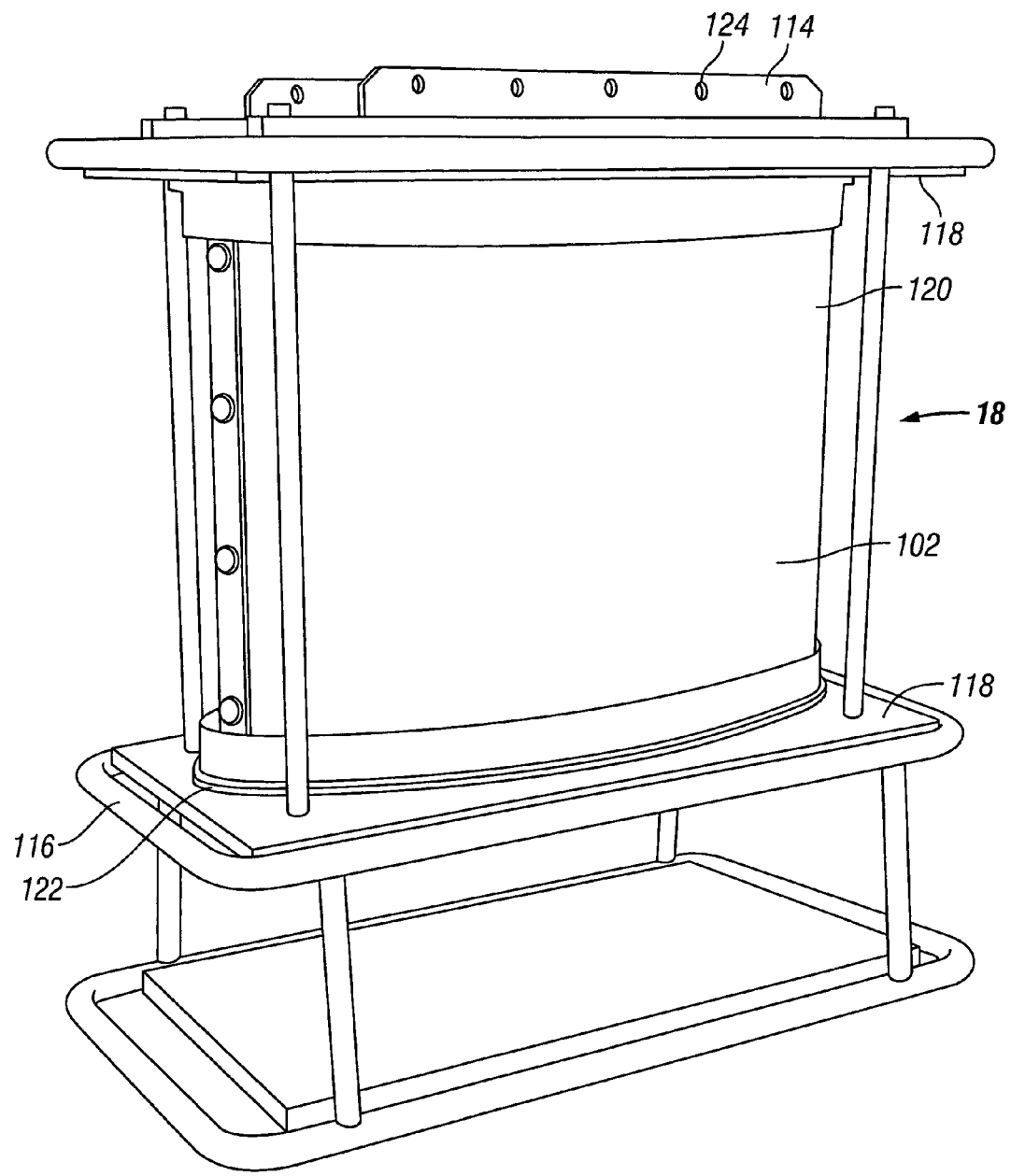
FIG. 2 shows an embodiment of a marine vibrator.

FIG. 2 shows an example implementation of a marine vibrator 18, which includes a vibrator source 120 mounted within a frame 116. A bracket 114 is connected to the top of the frame 116 and includes apertures 124 which may be used for deploying the vibrator 18 into the body of water (e.g., as shown in FIG. 1). The vibrator 18 includes an outer shell 102 that will be explained further below.

Figure 3:
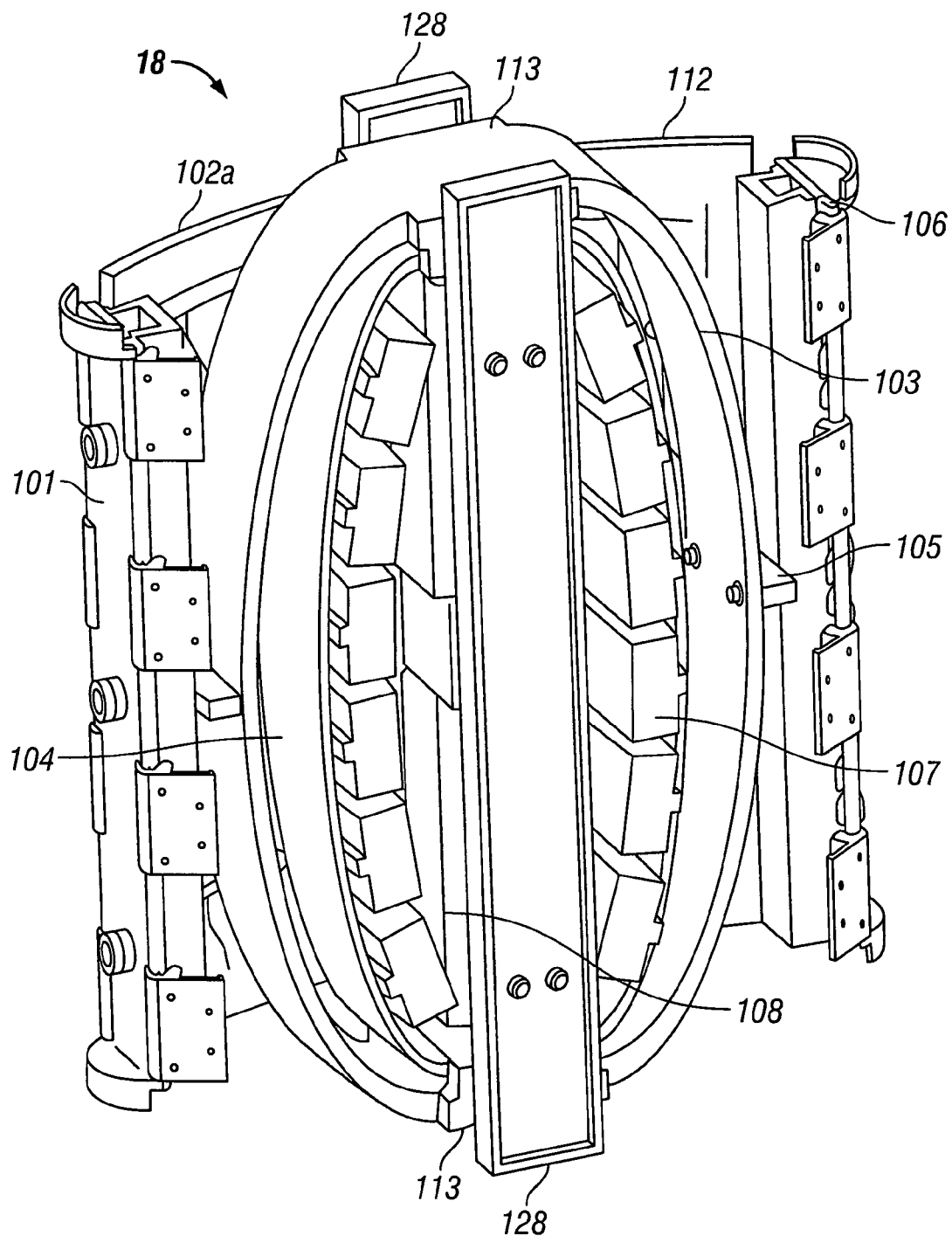
FIG. 3 shows the vibrator of FIG. 2 in partial cross-section.

FIG. 3 shows an embodiment of the vibrator in partial cross-section, which includes a driver 108, which may be a magnetostrictive driver, and which may preferably be formed from a magnetostrictive material sold under the trademark ETREMA TERFENOL-D, which is a registered trademark of Edge Technologies, Inc., Ames, Iowa. Although the particular embodiment of the vibrator described herein shows only a single driver, an embodiment in which a plurality of drivers are utilized in parallel is also possible. The embodiment further includes an outer driver spring 103, connected to each end 113 of the driver 108. In a particular example, the driver spring 103 may have an elliptical shape. The driver 108 further comprises magnetic circuitry (not shown separately) such as a wire coil that will generate a magnetic field when electrical current is applied to the magnetic circuitry. The magnetic field will cause the ETREMA TERFENOL-D material to elongate. By varying the magnitude of the electrical current, and consequently the magnitude of the magnetic field, the length of the driver 108 is varied accordingly. Typically, permanent magnets are used in addition to the magnetic circuitry to apply a bias magnetic field to the ETREMA TERFENOL-D driver 108 and variation in the total magnetic field amplitude is generated by applying a varying electrical current to the electrical coils (not shown separately) that are formed around the ETREMA TERFENOL-D rods. Variations in the length of the driver 108 resulting from change in magnetic field amplitude causes a corresponding change in the dimensions of outer driver spring 103.

Also shown in FIG. 3 is an inner spring 104, with masses 107 attached thereto. As further discussed below, the inner driver spring 104, with the masses 107 attached thereto, is included to cause the entire system to have a second resonance frequency within the seismic frequency range of interest. Although a vibrator system that included only the outer spring 103 would typically display a second resonance frequency, for systems having a size suitable for use in marine geophysical exploration, the second resonance frequency of the system including only the driver 108 and outer spring 103 would be much higher than the frequencies within the seismic frequency range of interest.

Mounting brackets 128, shown in FIG. 3, are fixedly connected at the upper and lower ends thereof to upper and lower end plates 118 (shown in FIG. 2). The driver 108 is fixedly connected at a longitudinally central location thereof to the mounting brackets 128, to maintain a stable reference point for the driver 108. The movement of the ends 113 of the driver 108 is unrestricted with reference to the mounting brackets 128.

The present example further includes the previously described outer shell (102 in FIG. 2), to which outer the spring 103 is connected through transmission elements 105. The form of the shell (102 in FIG. 2) is generally referred to as a flextensional shell. In a particular implementation of the vibrator, the outer shell (102 in FIG. 2) comprises two side portions that may be mirror images of each other and two end beams 101, with the side portions being hingedly connected to the end beams 101 by hinges 106. FIG. 3 shows one of the side portions of the outer shell (102 in FIG. 2), denoted in FIG. 3 as shell side portion 102a. When fully assembled a second shell side portion (not shown in FIG. 2), comprising substantially a mirror image of the displayed shell side portion 102a will be hingedly connected by the hinges 106 to the end beams 101, to complete a flextensional shell surrounding the assembled driver 108, outer spring 103 and an inner spring 104.

Referring back to to FIG. 2, the marine vibrator 18 further comprises top and bottom end plates 118. The assembled outer shell 102, comprising the two shell side portions and the two end beams (101 in FIG. 3) are sealingly attached to the top and bottom end plates 118. Although the outer shell 102 is sealingly engaged with the top and bottom end plates 118, when the marine vibrator 18 is in operation, the outer shell 102 will display movement with respect to the end plates 118, so the connection between the end plates 118 and the outer shell 102 will be a flexible connection, that might be provided, for example, by a flexible membrane 122 (not shown in detail).

Figure 6:
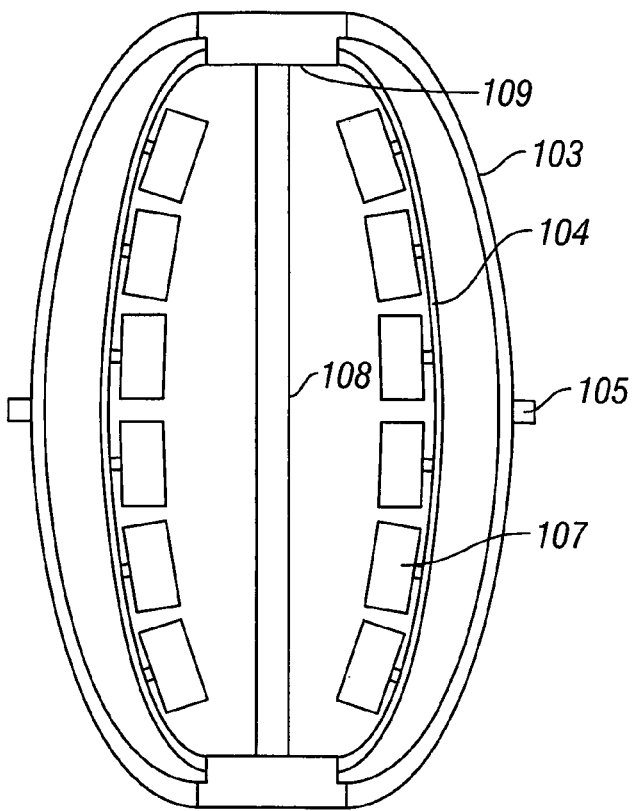
FIG. 6 shows the outer spring in combination with the driver, in combination with an inner spring with added mass.

Additional details of a particular implementation of the vibrator are shown in FIGS. 4, 5 and 6. FIG. 4 shows the outer driver spring 103. The outer driver spring 103 has two functions. One is to transform changes in the length of the magnetostrictive driver 108 into movement of the outer shell 102. The second function is to form a resonant system for more efficiently generating acoustic energy in a marine environment. As the length of driver 108 is shortened, the center portion of the driver spring 103 will move outwardly from the driver 108, and as the driver 108 is lengthened, the center part of the driver spring 103 will move inwardly toward the driver 108. Such movement of the center part of the outer spring 103 is transferred to the outer shell 102 by mean of the transmission elements 105. The movement of the outer shell 102 will thereby be enhanced with respect to the movement of the driver 108, with the amount of the enhancement, normally referred to as the "transformation factor", determined by the radius 110 of the driver spring 103. The value of the transformation factor typically varies from 2 to 5, depending on the radius of the driver spring 103. If larger amplitudes with less force are desired, a larger transformation factor may be selected. The two sections of the driver spring 103 can be interconnected by driver plates 109, which form the upper and lower end 113 of the driver 108, when the vibrator 18 is assembled.

FIG. 5 shows the outer driver spring 103 with the driver 108. FIG. 5 shows the driver spring 103 connected to the driver 108 through a driver plate 109, which is affixed to each end of the driver 108. The characteristics of the outer driver spring 103, the driver 108 and the outer shell 102 substantially determine the first resonance frequency of the vibrator. By selecting the spring constant of the driver spring 103 a resonance frequency can be achieved at a desired frequency within a seismic frequency range of interest.

FIG. 6 shows the marine vibrator with the inner driver spring 104 with masses 107 attached thereto. The inner driver spring 104 with masses 107 attached thereto will interact with the driver 108 to result in a second resonance frequency in the combined system. By selecting the spring constant of inner driver spring 104 and the mass of the masses 107 the second resonance frequency can be obtained at a desired frequency within the seismic frequency range of interest. The second resonance will boost the acoustic output of the marine vibrator and generate a nearly flat amplitude spectrum between the first and second resonance. The outer spring 103 and the inner spring 104 may each be formed from steel, glass fiber, carbon fiber or other suitable flexible material.

Figure 7:
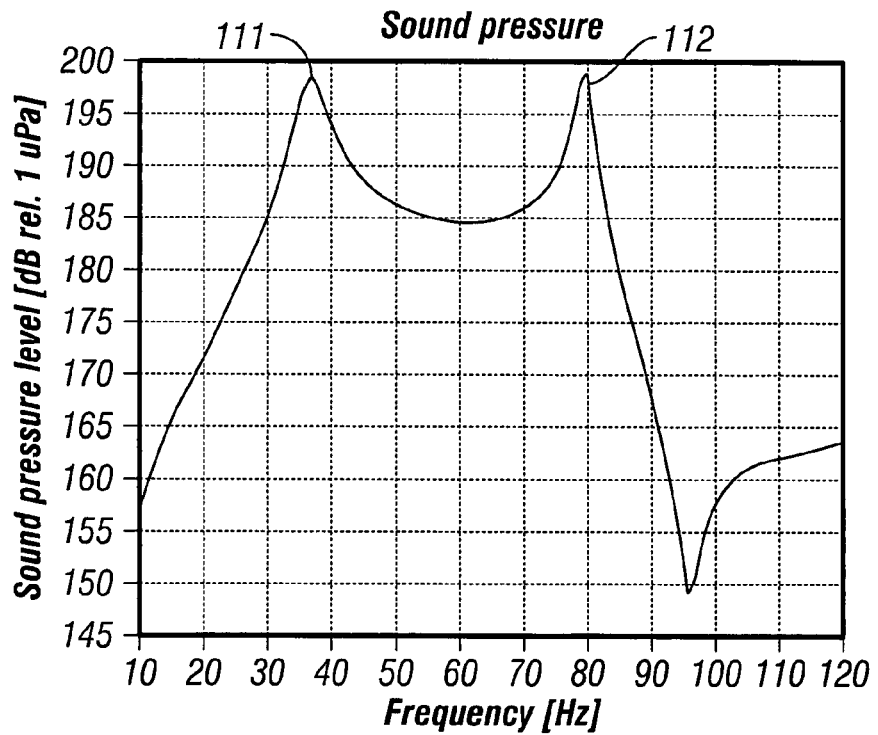
FIG. 7 shows a simulated amplitude spectrum with two resonances.

FIG. 7 shows the results from a finite element simulation of a marine vibrator according to the foregoing description. The first resonance frequency 111 results substantially from interaction of the outer driver spring 103 and the driver 108 with the outer shell 102. The second resonance frequency 112 results substantially from the interaction of the inner driver spring 104 with its added masses 107 and the driver 108.

In constructing any specific implementation of the vibrator, finite element analysis may be used as known to those of ordinary skill in the art. In any such analysis, the following principles of operation are relevant. If the outer shell 102 is approximated as a piston, then, for low frequencies, the mass load, or the equivalent fluid mass acting on the outer shell is:

$$M = \rho_0 \frac{8a^3}{3} \qquad (\text{Eq. 1})$$

where M represents the mass load, $\rho_0$ is density of the water in which the vibrator is used, and $\alpha$ is the equivalent radius for a piston which corresponds to the size of outer shell 102.

The outer shell 102 has a transformation factor $T_{shell}$ between the long and short axis of its ellipse, so that the deflection of the two shell side portions (side portion 102a in FIG. 3 and its mirror image on the other side of the outer shell 102) will have a higher amplitude than the deflection of end beams 101 (which interconnects the two side portions of the outer shell 102) caused by movement of the transmission elements 105. Further, the outer spring 103 creates a larger mass load on the driver 108 since the outer spring 103 also has a transformation factor between the long axis and short axis of its ellipse, with the long axis being substantially the length of the drive 8 and the short axis being the width of the elliptically shaped spring. Referring to this transformation factor as $T_{spring}$, the mass load on the drive 8 will be:

$$M_{driver} = (T_{shell})^2 \cdot (T_{spring})^2 \cdot \rho_0 \frac{8a^3}{3} \qquad (\text{Eq. 2})$$

The first resonance, $f_{resonance}$, a for the vibrator will be substantially determined by the following mass spring relationship:

$$f_{resonance} = \frac{1}{2\pi} \sqrt{\frac{K}{M_{driver}}} \qquad (\text{Eq. 3})$$

where $M_{driver}$ is the mass load on the driver 108. K represents the spring constant for the outer spring 103 combined with the driver 108, where the outer spring 103 is connected to the outer shell 102, through the transmission elements 105, end beam 101 and hinges 106.

To achieve efficient energy transmission with the seismic frequency range of interest, it is important to structure the vibrator to have the previously explained second resonance frequency within the seismic frequency range of interest. In the absence of the inner spring 104 (and masses 107), the second resonance frequency would occur when the outer driver spring 103, acting together with the driver 108, has its second Eigen-mode. Such resonance frequency, however, is normally much higher than the first resonance frequency, and accordingly, would be outside the seismic frequency range of interest. As is evident from the foregoing equation, the resonant frequency will be reduced if the mass load on outer spring 103 is increased. This mass load could be increased by adding mass to the driver 108, however, in order to add sufficient mass to achieve a second resonance frequency within the seismic frequency range of interest, the amount of mass that would need to be added to the driver would make such a system impractical for use in marine seismic operations.

Therefore, the inner driver spring 104 may preferably be included inside the outer driver spring 103 with added masses 107 on the side of the inner spring 104. The effect of such added mass is equivalent to adding mass in the end of the driver 108.

$$M_{inner} = (T_{inner})^2 \cdot M_{added} \qquad (\text{Eq. 4})$$

The extra spring, that is, the inner driver spring 104, will have a transformation factor $T_{inner}$ as well and will add to the mass load on the driver 108. Use of the inner spring 104, with the added mass 107, allows the second resonance of the system to be tuned so that the second resonance with within the seismic frequency range of interest, thereby improving the efficiency of the acoustic emitter in the seismic band.

$$f_{resonance2} = \frac{1}{2\pi} \sqrt{\frac{K_{inner} + K_{driver}}{(T_{inner})^2 \cdot M_{added}}} \qquad (\text{Eq. 5})$$

Where $K_{inner}$ represents the spring constant of the inner spring 104 and $K_{driver}$=spring constant of outer driver assembly (driver 108 and outer spring 103). Not only does such structure create two resonances in the seismic frequencies of interest, it will also make it possible to create large amplitudes for this type of vibrator.

Having explained a suitable example of a marine seismic vibrator, a control system according to the invention will now be explained. "Control system" as used in the present description is intended to mean a system which uses measurements from sensors coupled to the vibrator structure or are otherwise associated with the vibrator structure, the output of which are used to adjust a filter or convolution operator such that the true output of the vibrator has a spectral content as close as practical to the desired spectral content, and that harmonic frequencies in the vibrator output are suitably suppressed.

Figure 8:
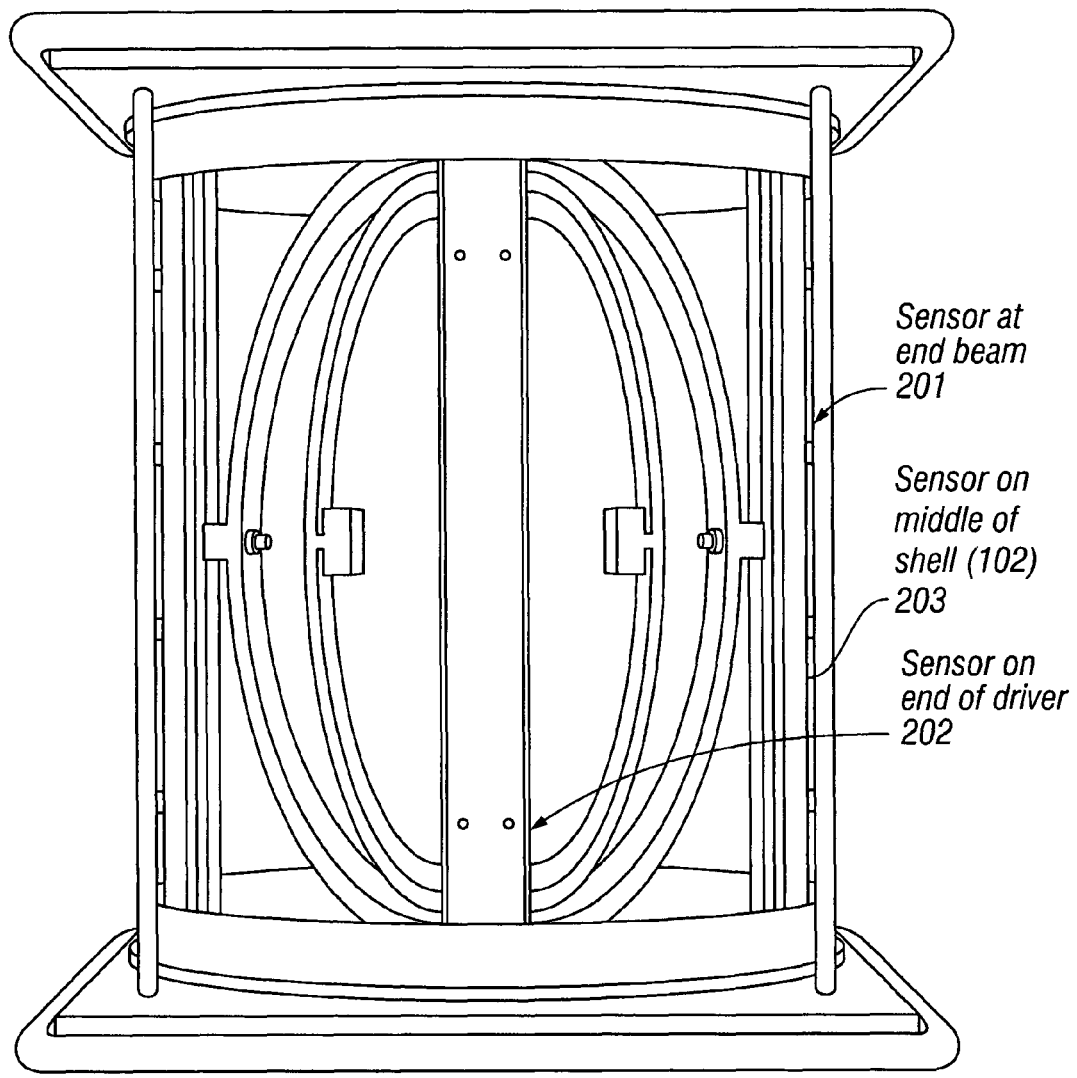
FIG. 8 shows an example of the foregoing vibrator having two sensors for operating a control system according to the invention.

Referring to FIG. 8, which shows a cut away view of the example vibrator described with reference to FIGS. 2 through 6, a first sensor 201 may be placed on or coupled to the end beam (101 in FIG. 3). A second sensor 202 may be coupled to one end of the driver (108 in FIG. 3). In one example, even a third sensor 203 may be placed on the middle of the shell (see FIG. 2). The first and second sensors 201, 202 may be any type of particle motion sensor, for example geophones or accelerometers. The third sensor 203 may be any type of particle motion sensor or a hydrophone disposed close to the wall of the shell (FIG. 2). The third sensor 203 is typically used for a control feedback loop (explained below) since it will have a close resemblance with the far field signal of the marine vibrator. In another example the first sensor 201 may be a hydrophone or other type of pressure or pressure time gradient sensors and the second sensor 202 may be a particle motion responsive device such as an accelerometer. In other examples, more than three sensors may be used to measure the response of the vibrator at other selected positions.

Figure 9:
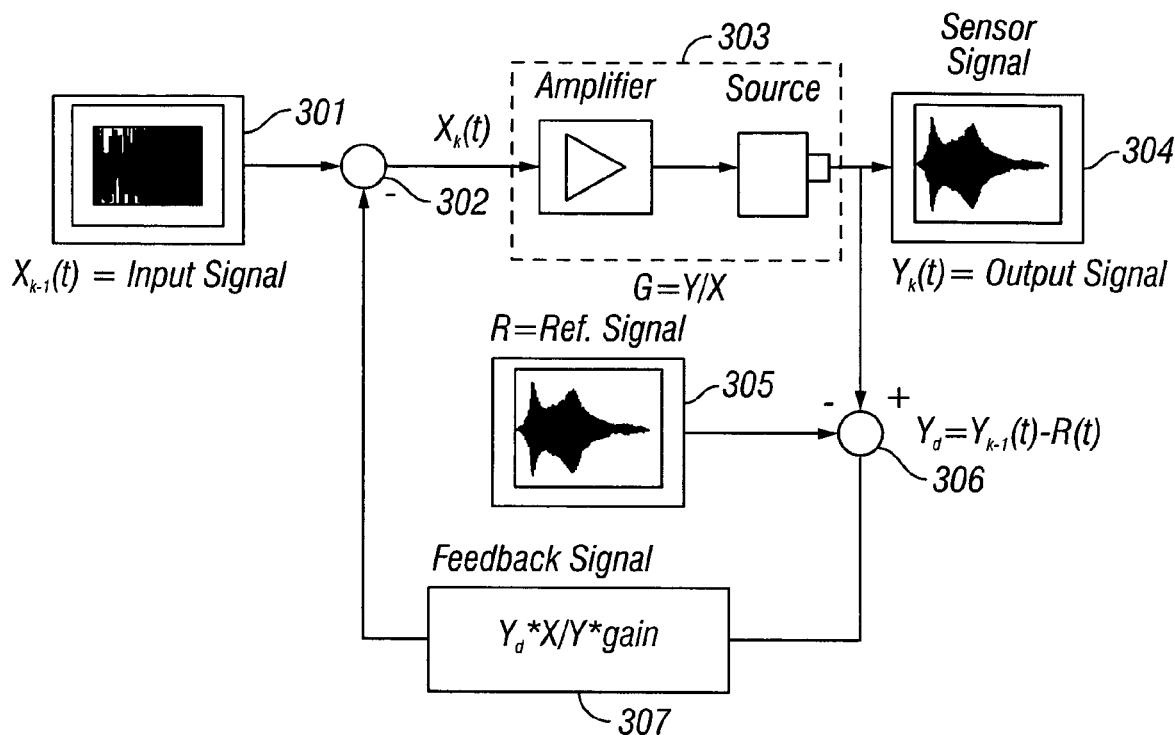
FIG. 9 shows an example of a control system to operate a vibrator such as shown in FIG. 3.

The output of the sensors 201, 202, 203 may be used as input to an iterative learning control (ILC) system to change the signal used to drive the vibrator (18 in FIG. 1) so that the vibrator will have: (i) an energy output having desired spectral characteristics; (ii) that the output spectral characteristics are repeatable and that (iii) harmonics in the vibrator output are substantially suppressed. Referring to FIG. 9, a signal generator 301 may provide an initial form of the seismic signal to be generated by the vibrator (18 in FIG. 1), for example, a linear sweep in the range of 10 to 100 Hz. The signal generator 301 may form part of the recording system (16 in FIG. 1). The functional components of the ILC system may also be performed on a general purpose computer forming part of the recording system or on another computer. The output of the signal generator 301 may be coupled to a summing amplifier 302 which also receives as input a correction signal generated by the ILC (explained below). The summing amplifier 302 output, which may be referred to as a "corrected driver signal" is coupled to a power amplifier, which drives the vibrator. The vibrator has coupled to it the sensors (201, 202, 203 in FIG. 8) as explained above. Collectively, the power amplifier, vibrator and sensors are shown at 303. One sensor output is shown in FIG. 9 for simplicity of the illustration, however, the same principle and components apply to each of the three sensors. The output of one of the sensors is shown at 304, and it represents the input signal convolved with the transfer function of the vibrator at the point of measurement. The sensor output signal 304 may be used at 306 to sum or compare (e.g., determine a difference) with a reference signal 305, which may be a desired vibrator output signal. At 307, the sum or comparison of the current sensor output with the reference signal 305 is combined to generate an error correction signal. The error correction signal is conducted to the summing amplifier 302 as explained above.

Operation of the ILC may be explained as follows. Iterative learning control (ILC) is a method of tracking control for systems that work in a repetitive manner. Examples of systems that operate in a repetitive manner include robot arm manipulators, chemical batch processes and reliability testing rigs and in this case marine vibrators. In each of these tasks the system is required to perform the same action over and over again with high precision.

By using information from previous repetitions, a suitable control action can found iteratively. The internal model principle yields conditions under which essentially perfect tracking can be achieved.

An inverted model L of the system's transfer function can be made of the vibrator system. The degree of model accuracy selected will depend on how accurate the control is desired to be. The same initial driver signal, referred to as u, may be repeated a selected number of times. After each iteration of the ILC system, the input driver signal u to the ILC system is updated. The ILC system uses a reference signal, designated r, to compare with the output y from the vibrator system. The difference between the vibrator system output y and the reference signal r, denoted by e, can then be filtered by the inverted model (using, for example, a causal and a non-causal filter) and added to the input of the ILC system (e.g., at summing amplifier 302). The ILC system is iterated and if the ILC system's transfer function does not change faster than the update to the input driver signal the error e will decrease with respect to time.

The desired result of operating the ILC system is that the error tends toward zero over time, that is, $e_k(t) \to 0$ when $k \to \infty$. For each iteration of the ILC system (k=k+1), $u_{k+1}(t) = u_k(t) + L^* e_k(t)$. The vibrator output may be described by the expression $y_k(t) = G^* u_k(t)$. The iterative process of the ILC may be described by the following expressions:

$$e_{k+1}(t) = r - G^* u_{k+1}(t) = r - G^*(u_k(t) + L^* e_k(t)) = r - G^* u_k(t) - GL^* e_k(t) = \{e_k = r - G^* u_k(t)\} = (1 - GL) e_k(t)$$

$$e_k(t) \to 0 \text{ if } (1 - G(j\omega)L(j\omega)) < 1 \text{ for all } \omega.$$

in which j represents the square root of (−1) and ω represents angular frequency. G and L represent, respectively, the system transfer function and the inverse system transfer function. $G(j\omega)$ and $L(j\omega)$ are not known for all frequencies because they are not measured at all frequencies. Therefore, a bandpass filter Q can be applied to filter out the unknown frequencies (i.e., those frequencies not measured by the sensors 201, 202, 203). This can be performed as follows:

Set $Q(i\omega)(1 - (G(i\omega)L(i\omega))$. Then it is possible to obtain:

$$Q(i\omega)(1 - G(i\omega)L(i\omega)) < 1$$

$u_{k+1} = Q(u_k + L e_k)$. The state space error if $u_{k+1} = u_k$ is defined as $u = Q(u + Le)$ and therefore $(1-Q)u = QLe$ $$e = r - G(u + Le) \Rightarrow (1 + GL)e = r - Gu$$

$$u = QLe/(1-Q) \Rightarrow (1 + GL + QL/(1-Q))e = r$$

$$e = (1-Q)r/((1-Q)(1+GL) + QLG) = (1-Q)r/(1 + GL - Q)$$

The state space error e is zero for any ω when $Q(ji\omega) = 1$. The foregoing uses the assumption that the driver signal becomes time invariant after a selected number of iterations, that is, $u_{k+1} = u_k$. To obtain a slowly varying adaptation and ultimate cessation of change of $u_{k+1}$, a gain factor may be added after L. If the vibrator system is non-linear and if the change for each iteration is large it could change the transfer function too quickly and the control system will not converge as suggested above. Non convergence could also occur if the vibrator system changes the transfer function faster than the time for each iteration. During the testing of the foregoing ILC system a gain of 0.3 was found to provide a good result. To handle the harmonics the control system typically will have a bandwidth of 1000 Hz even if the seismic signal generated by the vibrator system is 100 Hz or lower. It is important to measure the system transfer function to 1000 Hz to be able to attenuate harmonics up to 1000 Hz. If it is desired to attenuate harmonics up to 2000 Hz, the control system bandwidth should be adjusted accordingly. Bandwidth may include, among other parameters, the frequency range of the sensors (201, 202, 203 in FIG. 8), the frequency range of the reference signal (305 in FIG. 9), and the frequency range of the corrected driver signal.

The foregoing procedure can be and is preferably implemented in the frequency domain. It has been observed that certain frequencies are absent in the output of one of the two sensors, particularly at frequencies above the second resonance (112 in FIG. 7). Zero value at certain frequencies may make the ILC system unstable because the error function in the frequency domain includes division (which would be zero at the zero amplitude frequencies. By adding the output of the second sensor, the presence of zero amplitude frequencies in the combined sensor output is substantially eliminated, making implementation of the foregoing system stable in the frequency domain.

Figure 10:
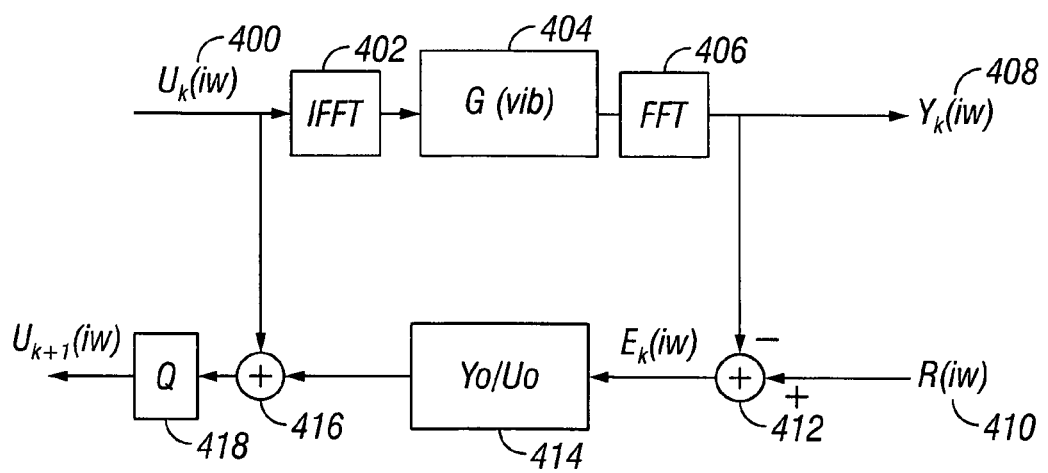
FIG. 10 shows an example of a control system implemented in the frequency domain.

An example implementation of the foregoing procedure in the frequency domain is shown schematically in FIG. 10, wherein a desired driver signal 400 in the frequency domain may be transformed to the time domain such as by inverse fast Fourier transform at 402, to provide an analog driver signal to operate the vibrator, at 404. Output of the sensors (201, 202, 203 in FIG. 8) may be transformed to the frequency domain such as by fast Fourier transform (FFT) at 406 to provide a representation of the actual vibrator output 408 in response to the input driver signal. The reference signal, at 410, may be combined with the FFT sensor output at 412 to generate an error signal. The error signal may be compared to a simple division at 414 of the driver signal with the actual vibrator output signal. The comparison may be summed at 416 with the driver signal to generate at 418 the subsequent driver signal.

Expressed mathematically (where capital letters represent the frequency domain):

$$U_{k+1} = (U_k + Y_0/U_0 * (R-Y)) * G$$

and the stability criteria may be evaluated similarly as explained above with reference to the time domain ILC system:

$$Q(i\omega)(1 - G(i\omega)Y_0(i\omega)/U_0(i\omega)) < 1$$

Figure 11:
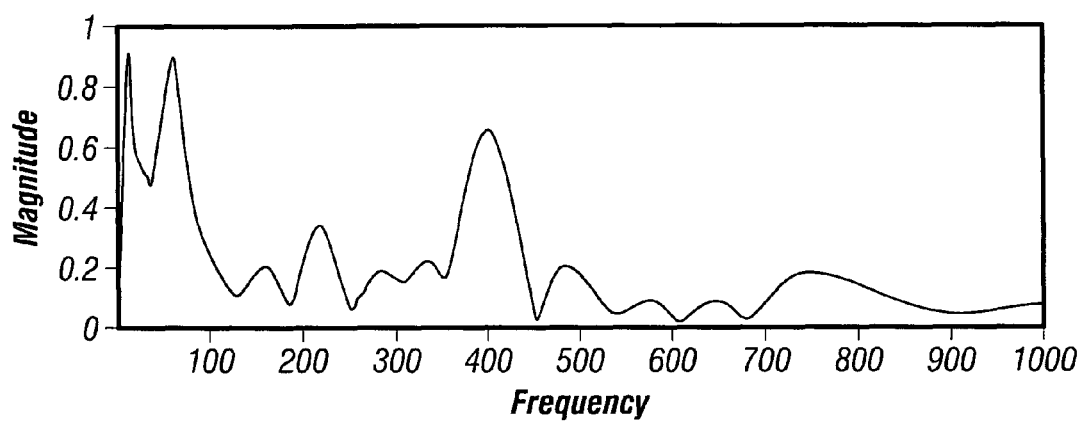
FIG. 11 shows a graph of output of a sensor disposed on the middle of the shell of the marine vibrator with critical notches at 455 Hz, 610 Hz and 690 Hz.
Figure 12:
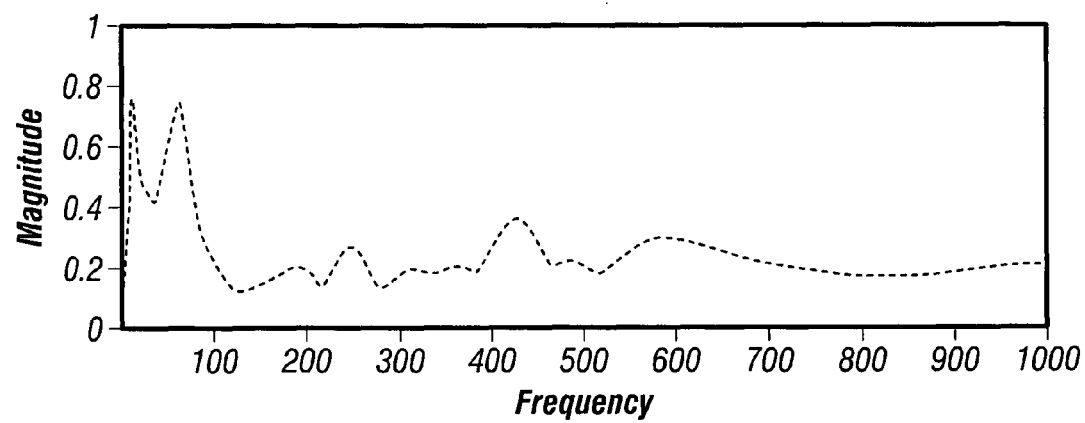
FIG. 12 shows frequency response of a sensor disposed at the end of beam of the marine vibrator with no critical notches.

A particular advantage to using two or three sensors as input to the ILC is the low probability of having zero amplitude at any single frequency in the seismic frequency range of interest plus harmonics thereof. By substantially eliminating zero amplitude frequencies, implementation of the ILC in the frequency domain is improved by reducing instances of division by zero. An example of sensor frequency response is shown in the graph of FIG. 11, wherein the output of the third sensor (203 in FIG. 8). Note the critical notches (substantially zero output) at 455, 610 and 690 Hz. A simulated frequency response of the first sensor (201 in FIG. 1) mounted on the end beam is shown in the graph of FIG. 12 and has substantially no notches in its response.

A marine vibrator system operated using two or three different sensors as input for an ILC system may provide more stable control over the spectral content and better rejection of harmonics than systems using only a single sensor to control the ILC.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for controlling output of a marine seismic vibrator, comprising:
    operating the vibrator using a predetermined driver signal, the vibrator having a substantially elliptical outer radiating surface in contact with a body of water;
    measuring a vibrator output signal at least one end beam supporting each longitudinal end of the radiating surface and in a middle of the radiating surface;
    using the at least two measured vibrator output signals to determine a corrected driver signal, wherein the corrected driver signal results in fewer harmonics of fundamental frequencies in the vibrator output; and
    operating the vibrator using the corrected driver signal.

2. The method of claim 1 wherein the corrected driver signal has a same bandwidth as harmonic frequencies to be attenuated in a signal output of the vibrator.

3. The method of claim 1 wherein the vibrator output signal is measured on a piezoelectric driver element in the vibrator and is measured on an exterior beam of the vibrator, wherein the exterior beam is coupled to the driver through a spring.

4. The method of claim 1 wherein the determining a corrected driver signal comprises determining a difference between a reference signal and an output of the vibrator as related to the measured vibrator output signals.

5. The method of claim 1 wherein the measuring vibrator output signals, using the vibrator output signals and determining a corrected driver signal is repeated until a most recently determined corrected driver signal differs from the previously determined corrected driver signal by less than a selected threshold.

6. The method of claim 1 wherein the marine seismic vibrator comprises:
    a substantially elliptically shaped outer shell;
    a driver having a first and second end;
    at least one outer spring connected between the first end and the second of said driver;
    at least one inner spring connected between the first end and the second end of said driver, said inner spring having one or more masses attached thereto;
    at least one transmission element connecting the outer spring with said outer shell; and
    wherein said springs and said masses are selected to generate a first resonance frequency and a second resonance frequency within a frequency range between 1 Hz and 300 Hz.

7. The method of claim 6 wherein said driver comprises a magnetostrictive driver.

8. The method of claim 6 wherein the outer driver spring together with the driver and the outer shell determine a first resonance frequency of the marine vibrator.

9. The method of claim 6 wherein the inner driver spring and the masses attached thereto and said driver determine a second resonance frequency of the marine vibrator.

10. The method of claim 6 wherein said outer shell is a flextensional shell.

11. The method of claim 1 wherein the determining a corrected driver signal is performed in the frequency domain.

12. A method for marine seismic surveying, comprising:
    deploying at least one marine vibrator and a plurality of seismic sensors in a body of water above an area of the subsurface to be evaluated;
    operating the vibrator using a predetermined driver signal, the vibrator having a substantially elliptical outer radiating surface in contact with the water;

measuring a vibrator output signal at least one end beam supporting each longitudinal end of the radiating surface and in a middle of the radiating surface;

using the at least two measured vibrator output signals to determine a corrected driver signal, wherein the corrected driver signal results in fewer harmonics of fundamental frequencies in the vibrator output;

operating the vibrator using the corrected driver signal; and detecting seismic energy at the plurality of seismic sensors.

13. The method of claim 12 wherein the vibrator output signal is measured on a piezoelectric driver element in the vibrator and is measured on an exterior beam of the vibrator, wherein the exterior beam is coupled to the driver through a spring.

14. The method of claim 12 wherein the determining a corrected driver signal comprises determining a difference between a reference signal and an output of the vibrator as related to the measured vibrator output signals.

15. The method of claim 12 wherein the measuring vibrator output signals, using the vibrator output signals and determining a corrected driver signal is repeated until a most recently determined corrected driver signal differs from the previously determined corrected driver signal by less than a selected threshold.

16. The method of claim 12 wherein the marine seismic vibrator comprises:

a substantially elliptically shaped outer shell;

a driver having a first and second end;

at least one outer spring connected between the first end and the second of said driver;

at least one inner spring connected between the first end and the second end of said driver, said inner spring having one or more masses attached thereto;

at least one transmission element connecting the outer spring with said outer shell; and wherein said springs and said masses are selected to generate a first resonance frequency and a second resonance frequency within a frequency range between 1 Hz and 300 Hz.

17. The method of claim 16 wherein said driver comprises a magnetostrictive driver.

18. The method of claim 16 wherein the outer driver spring together with the driver and the outer shell determine a first resonance frequency of the marine vibrator.

19. The method of claim 16 wherein the inner driver spring and the masses attached thereto and said driver determine a second resonance frequency of the marine vibrator.

20. The method of claim 16 wherein said outer shell is a flextensional shell.

21. The method of claim 12 wherein the determining a corrected driver signal is performed in the frequency domain.

22. The method of claim 12 wherein the corrected driver signal has a same bandwidth as harmonic frequencies to be attenuated in a signal output of the vibrator.

* * * * *